United States Patent [19]
Falk et al.

[11] Patent Number: 5,310,133
[45] Date of Patent: May 10, 1994

[54] MAGNETIC TAPE TRANSPORT DEVICE WITH TAPE TENSION ROLLER ON A LEVER SUBJECTED TO MOTOR TORQUE

[75] Inventors: Gerhard Falk, Rossdorf; Wolfgang Fell, Seeheim, both of Fed. Rep. of Germany

[73] Assignee: BTS Broadcast Television Systems GmbH, Darmstadt, Fed. Rep. of Germany

[21] Appl. No.: 123,707

[22] Filed: Sep. 17, 1993

Related U.S. Application Data

[63] Continuation of Ser. No. 718,026, Jun. 20, 1991, abandoned.

[30] Foreign Application Priority Data

Jun. 28, 1990 [DE] Fed. Rep. of Germany ....... 4020543

[51] Int. Cl.⁵ ............................................... G11B 15/43
[52] U.S. Cl. ........................................ 242/190; 360/71
[58] Field of Search ................. 242/189, 190; 360/71, 360/95, 85

[56] References Cited

U.S. PATENT DOCUMENTS

| | | | |
|---|---|---|---|
| 4,739,948 | 4/1988 | Rodal et al. | 242/190 |
| 4,797,760 | 1/1989 | Rademacher et al. | 360/95 |
| 4,826,097 | 5/1989 | Grant et al. | 242/200 |
| 4,974,101 | 11/1990 | Sturm et al. | 360/85 |

OTHER PUBLICATIONS

IBM Tech. Disclosure Bulletin, vol. 20, No. 6, Nov. 1977.

*Primary Examiner*—Daniel P. Stodola
*Assistant Examiner*—John Q. Nguyen
*Attorney, Agent, or Firm*—Frishauf, Holtz, Goodman & Woodward

[57] ABSTRACT

In a magnetic tape transport device having supply and take-up reels and tape guide elements, as well as a scanner, there is engaged with the tape on each side of the scanner a tape tension roller on the free extremity of a tape tension lever which is subjected to torque at its pivot by a d.c. motor for maintaining the desired tension of the tape. An angular position indicator is connected to the pivot of the lever and a regulation loop is provided for controlling the tape tension in a manner consistent with the tape speed. A capstan drive of the tape is not necessary.

8 Claims, 5 Drawing Sheets

PRIOR ART

MAGNETIC TAPE TRANSPORT DEVICE WITH TAPE TENSION ROLLER ON A LEVER SUBJECTED TO MOTOR TORQUE

This application is a continuation of application Ser. No. 07/718,026, filed Jun. 20, 1991, now abandoned.

CROSS-REFERENCE TO RECENT PATENTS OR RELATED SUBJECT MATTER

U.S. Pat. No. 4,797,760—issued Jan. 10, 1989—Inventors: (Karl-Heinz RADEMACHER and Theo WOLF)

U.S. Pat. No. 4,974,101—issued Nov. 27, 1990—Inventors: (Rainer STURM, et al.)

This invention concerns a transport device for a magnetic tape having two tape reels, tape guide elements and a scanning device, the scanning device serving for recording on the tape or playback from the tape, or both.

In such a magnetic tape equipment the tape is moved past scanning locations where it is scanned by magnetic heads for video, sound, erasing and other functions. For that movement the tape is unwound from a supply reel and wound up on a take-up reel. The tape transport device required for those operations has the following particular tasks:

generation of a timewise constant tension force in the magnetic tape at the scanning locations which lie in the tape path between the reels;

rewinding the magnetic tape at high speed in order to bring some particular location on the tape to the scanning locations; and provision of a stable self-winding type of reel for the reel serving as the take-up reel because the forces operating during tape transport must be transmitted through the tape stored in the reels.

In addition the disturbances which may arise during operation—as for example, changes in friction at the tape guides, effects from a tape that is loosely wound on a reel, or a dropout of the electric power source—should not be allowed to lead to a loose tape or to excessively high stresses on the tape.

The fulfilling of these requirements is particularly critical in the case of magnetic tape equipment in which the magnetic tape is looped around a scanning device as is currently done in video recorders. In addition, in the case of video recorders another important requirement comes into play, namely, the constancy of the transport speed in playback and/or recording operations.

In a normal tape transport device for video recorders two regulation loops independent from each other ar provided respectively for the tape tension and for the tape speed. In this case the magnetic tape passes, on its way from a supply reel to a take-up reel, a first tape tension roller, a tape drive roller, the scanning device, other magnetic heads and a second tape tension roller. The speed is set by the tape drive roller, known as the capstan. The capstan is driven by a motor, the torque of which is regulated by comparison of the desired or reference speed and the actual speed of the tape.

The two regulating loops for the tape tension, operating independently of each other, maintain that tension in each case on the path of the tape lying between the capstan and the particular reel. If the tape tension becomes smaller as a result of movement of the tape in the direction towards the reel, the corresponding tape tension roller moves itself in the direction which lengthens the path of the tape. In this operation, a tape sensor generates a control signal for the drive of the reel in such a way that the reel winds up the tape on the reel and thus maintains the tape tension. If the tape is moved in the opposite direction by the capstan, then the regulating loop just mentioned produces a yielding of the reel in question with maintenance of the necessary tape tension.

Since the friction of the tape on the capstan is smaller than the friction forces acting on the tape at the guiding elements, including the scanning device, the small envelopment angle of the tape about the capstan requires the force transferable from the capstan to the tape to be amplified by a pressure roller acting on the tape. This operates reliably so long as the capstan is driving a tape. The axis of swing of the pressure roller is of course normally parallel to the capstan axis. There are, however, operating conditions—for example, strong braking during fast reeling—in which the tape drives the capstan. In this case tape guiding becomes unstable, with the consequence that the pressure roller acting on the tape pushes the tape against the laterally limiting portions of a tape guiding path roller, and the tape may then be damaged.

A further disadvantage of the known transport device above mentioned results from the fact that the regulating loops are coupled to each other only through the tape and the tape can transmit only tension forces.

SUMMARY OF THE INVENTION

It is an object of the present invention to constitute a tape transport device in such a way that damage to the tape is prevented.

Briefly, at least one tape tension roller is mounted so that it can swing on a pivoting tape tension lever and the lever is provided with a motor for driving the pivoting movement of the lever and exerting torque to produce tape tension.

The tape transport device of the invention has the advantage that reliable and safe transport of the tape is possible over a wide range of tape speeds. In particular, the problems relating to the operation of the capstan are resolved in the tape transport device of the invention. In fact, a capstan drive can be dispensed with if desired. The device of the invention makes possible a desired regulation of the tape tension, even a quick correction after a change of tape speed or of the position of the tape tension lever, so that loosening of the tape is avoided with great reliability and freedom from damage.

The tape transport device of the present invention is primarily intended for use in magnetic tape equipment having a scanning device with rotating magnetic heads in which the magnetic tape is helically looped at least part of the way around a cylindrical surface. In these magnetic tape equipments, which are utilized mainly for recording of video signals in analog or digital form, the requirements imposed on the tape transport device are particularly high. A reason, among others, for these high requirements is that the signals are recorded in individual tracks running obliquely to the tape edge which have precisely prescribed distances from each other, so that they can be scanned as accurately as possible in playback from the tape. Application of the invention to other equipment utilizing a recording carrier in the form of a tape, however, is not to be excluded from consideration or practice.

It is convenient for the tape tension lever to be directly connected with the guiding motor shaft at its fulcrum. The motor itself can be a brushless dc motor equipped with an angular position signal source.

A spring may be conveniently be provided to exert torque on the motor shaft so that the tape tension lever will be brought into a prescribed angular position when the motor has no driving current.

It is also useful to provide a driven tape tension roller and motorized lever, as above mentioned, both between the scanning device and a tape supply reply and between the scanning device and a take-up reel.

Further details usefully incorporated in a tape transport device of the present invention are described in an illustrated description which follows.

DRAWINGS

The invention is further described by way of illustrative example with reference to the annexed drawings, in which:

FIG. 3a is a cross-section through the axis of the pivot of a motorized tape tension lever utilized in the invention showing a tape tension roller in cross-section in a parallel section plane to the rear, with a side elevation view of the portions of the device in between.

FIG. 3b is a cross-section of a portion of the housing of the tape tension motor, in a plane perpendicular to the cross-section shown in FIG. 3a.

The same parts, when they appear in the respective figures of the drawing are designated with the same reference numerals.

DESCRIPTION OF THE ILLUSTRATED DEVICES

Figure 1:
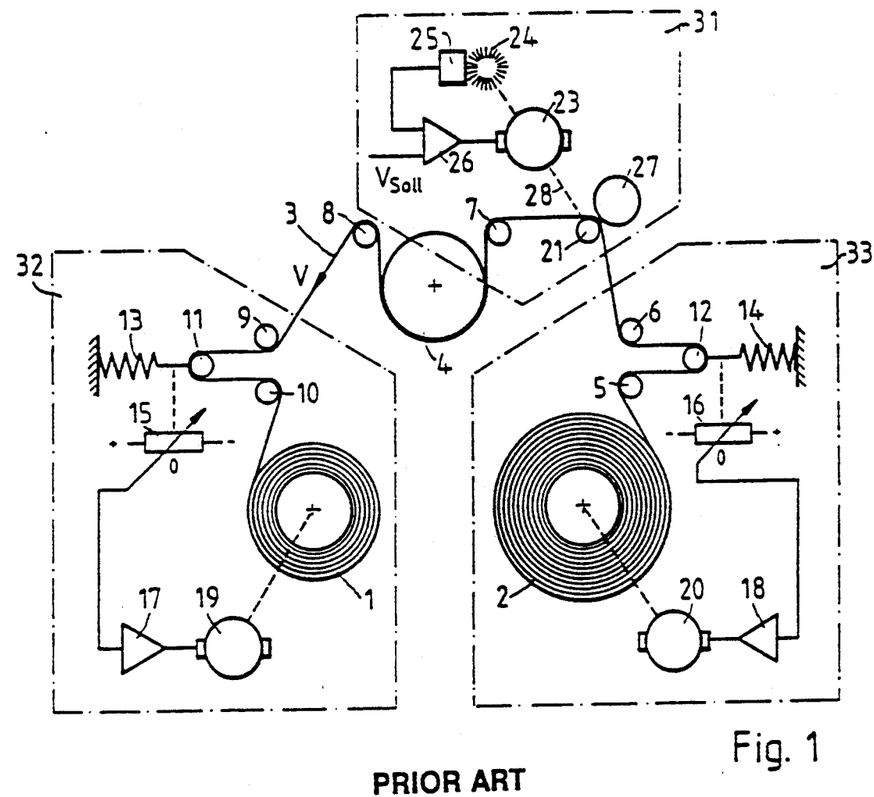
FIG. 1 is a diagram of a heretofore known tape transport device, drawn in a plane perpendicular to the axes of the reels, tape guiding rollers, capstan and scanning device.

The tape transport device heretofore known which is shown in FIG. 1 has a take-up reel 1 and a supply reel 2. In playback or recording operation and also in fast forward transport, the magnetic tape 3 is unwound from the supply reel 2 at the velocity v and is guided over various tape guiding elements, around the scanner 4 and to the take-up reel. In reeling back and, sometimes in reverse playback, the movement of the tape takes place in the opposite direction.

The tape guide elements include rollers 5 to 10 mounted in bearings at fixed points and tape tension rollers 11 and 12 which are mounted in bearings at the respective ends of tape tension levers which are not shown in the drawing and exert on the magnetic tape a tension with the help of respective springs 13 and 14. The tension depends upon the stretching of the springs. The positions of the tape tension rollers 11 and 12 at any moment of time are respectively converted into electrical signals by means of transducers 15 and 16, which are illustrated in FIG. 1 as potentiometers. The electrical signals are respectively amplified by amplifiers 17 and 18, and supplied to respective motors 19 and 20 for driving the take-up and supply reels 1 and 2.

The drive of the magnetic tape 3 is produced by a capstan 21, which is mounted on the shaft of a capstan motor 23. A pressure roller 27 appears on the tape on its side opposite to the capstan 21 in a well known way for increasing the friction forces produced at the capstan 21. On the capstan shaft there is a tachometer disk 24, which is usually optically coupled to a suitable sensor 25 which generates a predetermined number of pulses per revolution of the capstan 21. These pulses are supplied to a regulator 26 to which a signal representing the desired velocity reference $v_r$ of the magnetic tape and the regulator output is supplied to the motor 23. The reference velocity $v_r$ is set so as to optimize the tracking of oblique tracks on the tape when the magnetic tape equipment is of the oblique track type. Methods and circuits for these purposes are so well known that any further description in connection with the present invention is unnecessary.

A regulator 31 having a servo loop 24, 25, 26 imparts the tape speed to the magnetic tape 3 by driving the capstan 21. So long as this regulation and an engagement between the roller 27 and the magnetic tape 3 persists, the capstan also separates from each other the effects of the similar regulators 32 and 33. These regulators 32 and 33 are subordinated to the regulator 31 insofar as the tape speed v is prescribed by the regulator 31. The task of the reel regulators 32 and 33 is then merely to control the reels 1 and 2 so that the tape tension rollers 11 and 12 are, so far as possible, put into a prescribed position, so that in consequence the tape tension is maintained at a prescribed value. The possibility of malfunction by tape loosening and other effects have already been mentioned above.

Figure 2:
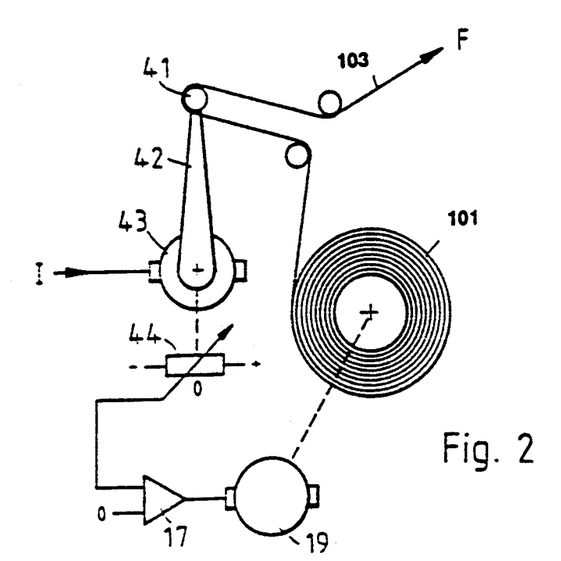
FIG. 2 is a schematic representation of a portion of a tape transport device embodying the present invention.

In the embodiment of the invention of which the most distinctive parts are shown in FIG. 2, a tape tension roller 41 is located on the end of a lever 42, which is affixed against relative rotation where it is mounted on the shaft of a motor 43, hereinafter referred to as the tape tension motor. The tape tension can thus be ascertained and determined from a current I supplied to the motor 43. The position, particularly the angular setting of the tape tension lever 42 is converted into an electrical signal by means of an angular position indicator, or angle transducer 44. The angle transducer 44 is represented in FIG. 2, schematically as a potentiometer. In a practical implementation of a transport device according to the invention, it has been found that angle transducers utilizing a Hall effect element is particularly effective and convenient. The electric signal of the angle transducer 44 is then supplied to a regulator 117, the output of which is connected to the reel drive motor 19. The component group consisting of the tape tension motor 43, the tape tension lever 42 and the tape tension roller 41 is hereinafter referred to as the tape tension device.

The components of FIG. 2 designated 101 and 103 correspond to components designated 1 and 3 in FIG. 1. This same relation applies in elements designated by numerals greater than 100 in other figures.

Figure 3A:
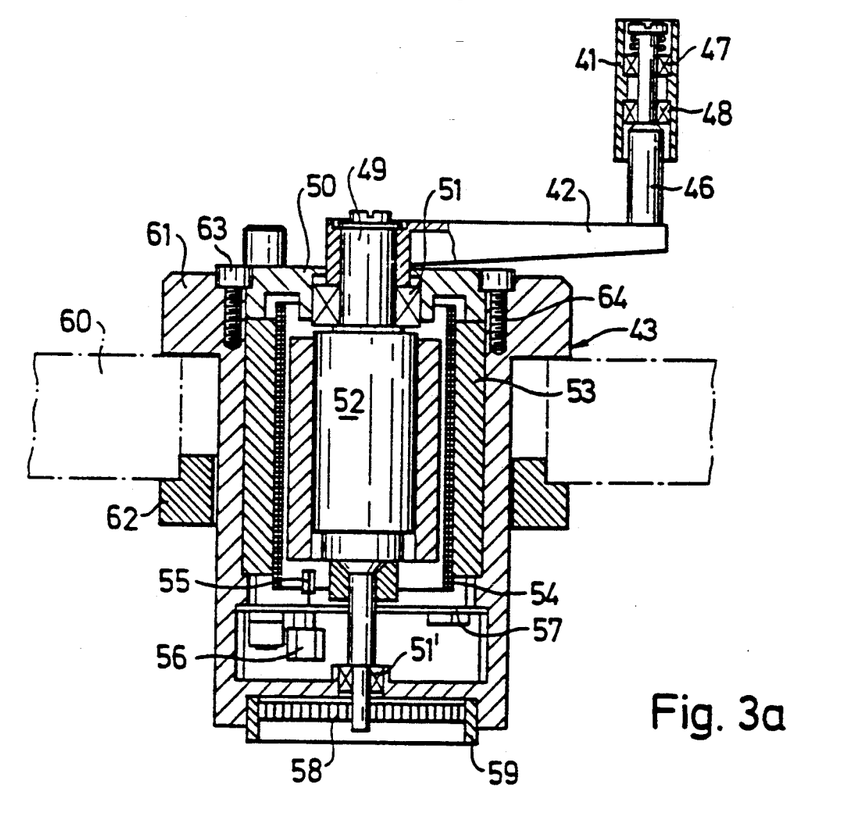
Figure 3B:
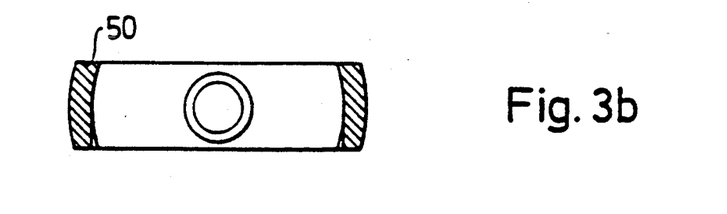

FIGS. 3a and 3b, show an illustrated embodiment of a tape tension device in a more detailed representation. In FIG. 3a, the tape tension motor 43 is shown in longitudinal cross-section, while FIG. 3b makes clear the configuration of a part of the housing of the motor. The tape tension roller 41 is mounted so that it can turn on an axle 46 in a manner facilitated by ballbearings 47 and 48. The axle 46 is located at the outer end of the tape tension lever 42. The lever is fixed on the shaft 49 of the tape tension motor 43 so as to rotate with it. The shaft 49 is held in ballbearings 51 and 51' mounted in a housing 50, and carries a permanent magnet rotor 52. The stator 53 has a stator winding 54. A Hall element 55 serves a source of an angle signal and is mounted on a circuit board 57 together with a circuit 56 pertaining to it. In order to make possible the mounting of the disk-shaped circuit board 57, the casing has a cross-section shown in the lower part of FIG. 3a.

In order to bring the tape tension lever 42 into a defined position even in the absence of an current flowing in the stator winding 54, a spiral spring 58 is disposed in the lower portion of the housing 50, and is connected inwardly with the shaft 49 and externally with a ring 59 clamped or snapped in the housing.

Two tension rings 61 and 62, of which the upper tension ring 61 is connected to the housing 50 by means of the screws 63 and 64, and the lower ring can be held against the upper one by means of screws, are not shown in detail. These means provide for holding the tape tension device on a base plate 60 simply sketched in by chain-dotted lines in FIG. 3a.

Figure 4:
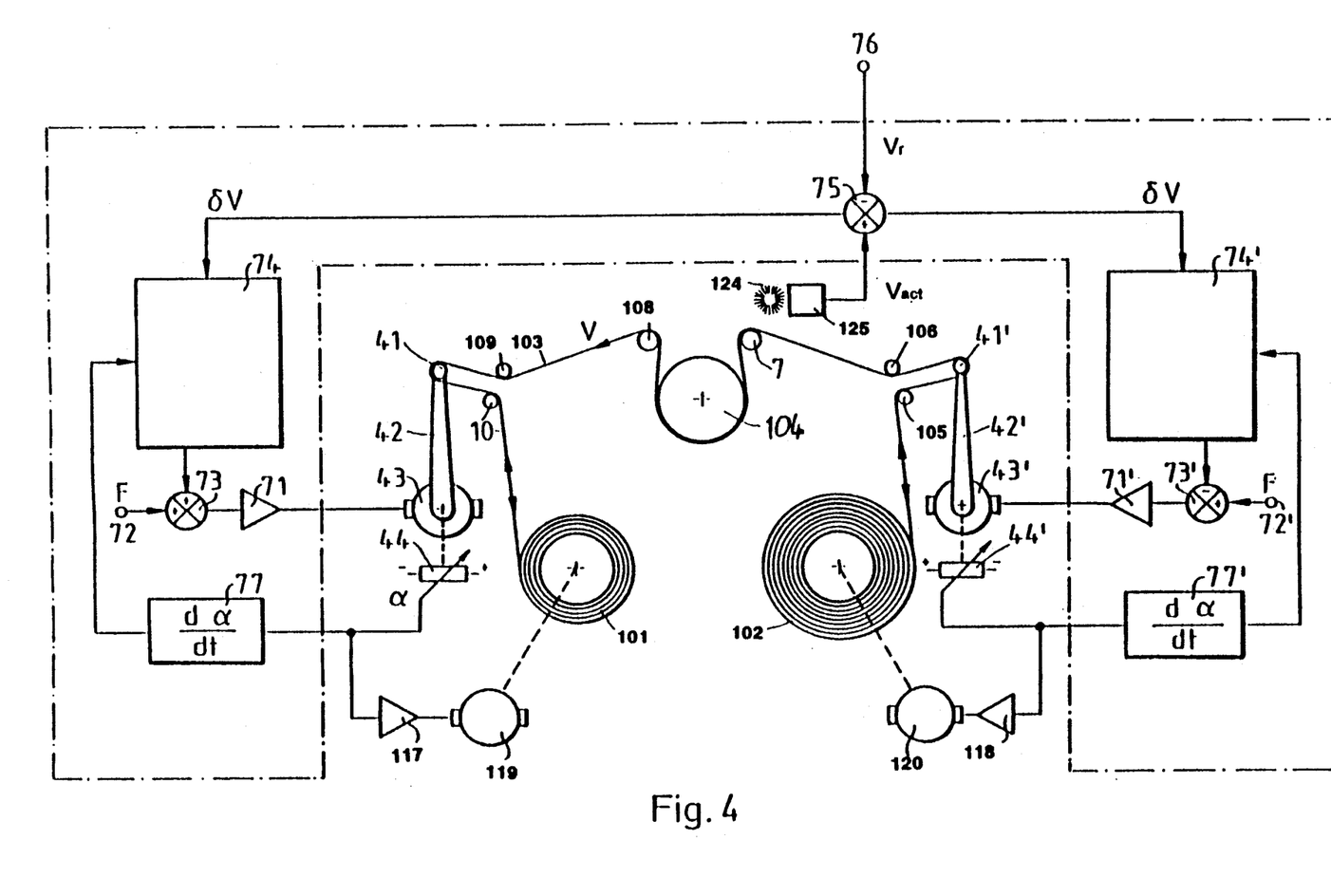
FIG. 4 is a schematic representation of the same kind as FIG. 1, showing the tape transport device of the invention including principal parts of the regulation loops belonging to the device.

FIG. 4 is a schematic representation of a tape transport device according to the invention together with the most important component groups of the regulating circuit pertaining to it. The pickup reel 101, the supply reel 102, the path deflecting rollers 105, 106, ... 110 and the scanner 104, correspond essentially to those of the previously known tape transport device shown in FIG. 1. The tachogenerator 124, 125, however, is disposed in the device of FIG. 4 on the shaft of a path deflecting roller 107. The reel motors 119 and 120, as well as the regulation amplifiers 117 and 118 pertaining to them, correspond essentially to those shown for the previously known tape transport device.

Between the tape guiding rollers 109 and 110, there is provided a tape tension roller 41 which is mounted on a tape tension lever 42 which is driven to swing by means of a tape tension motor 43. This tape tension device has already been described in more detail in connection with FIGS. 2 and 3. An identical tape tension device is located on the other side of the scanner 104, and consists of a tape tension roller 41', the tape tension lever 42' and the tape tension motor 43'. The output signals of the angular position transducers 44, 44' respectively control the reel motors 119 and 120 through the amplifiers 117 and 118.

Electric currents are supplied respectively to the tape tension motors 43 and 43', which correspond in each case to a tape tension that is to be provided, through the amplifiers 71 and 71'. A voltage corresponding to the reference or desired value of the tape tension is applied to the inputs 72 and 72'. It is necessary for the movement of the tape that the tape tension, in a manner corresponding to the transport direction of the tape, should be higher on one side of the scanner than on the other side. For that purpose, addition circuits 73 and 73' are provided by which the output signal of each of the two PID regulators are added to or subtracted from the predetermined value F. A signal $\delta v$ is supplied to the regulators 74 and 74' which is derived in a subtractor 75 from the actual speed value $v_{act}$ of the tape speed and from a reference value $v_{ref}$ supplied at 76.

In order to obtain a faster reaction of tape tension regulation, the signals of the angle transducers 44 and 44' are supplied respectively through differentiating circuits 77 and 77' to the regulators 74 and 74'.

Figure 5:
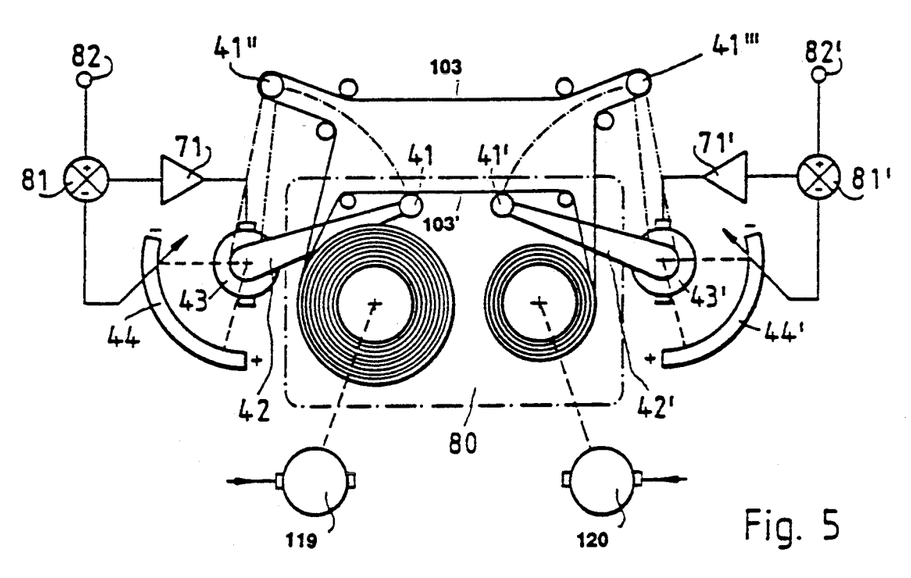
FIG. 5 is a diagram of the kind shown in FIG. 4, illustrating the use of parts of the tape transport device of the invention for threading or unthreading magnetic tape from or to a cassette.

In what follows there will be explained, with reference to FIG. 5, how the tape tension devices can be used for pulling the magnetic tape 3 out of a cassette 80. In their quiescent positions shown in FIG. 5, in solid lines, the tape tension rollers 41 and 41' and the tape tension levers 42 and 42' are located in such a position that the tape tension rollers 41 and 41' project into the cassette 80 when the cassette is inserted into the magnetic tape equipment. The tape tension motors 43 and 43', together with the angle signal sources 44 and 44', substractors 81, 81' and amplifiers 71, 71' constitute respective regulating loops to which a position signal can be supplied respectively at 82 and 82'. For threading the magnetic tape out of its position 103' located in the cassette into the magnetic tape equipment, a signal is supplied at 82 and 82' that rises in a ramp-like manner from one extreme value (position of the tape tension rollers 41 and 42 in the cassette) to another extreme value (tape tension rollers 41 and 42 in the working positions 41'' and 41''' respectively). In that manner, a quick but nevertheless tape-sparing threading of the tape is possible by means of a controlled movement of the tape tension rollers. For removing the magnetic tape 3, the above described operation runs in the opposite direction.

Figure 6:
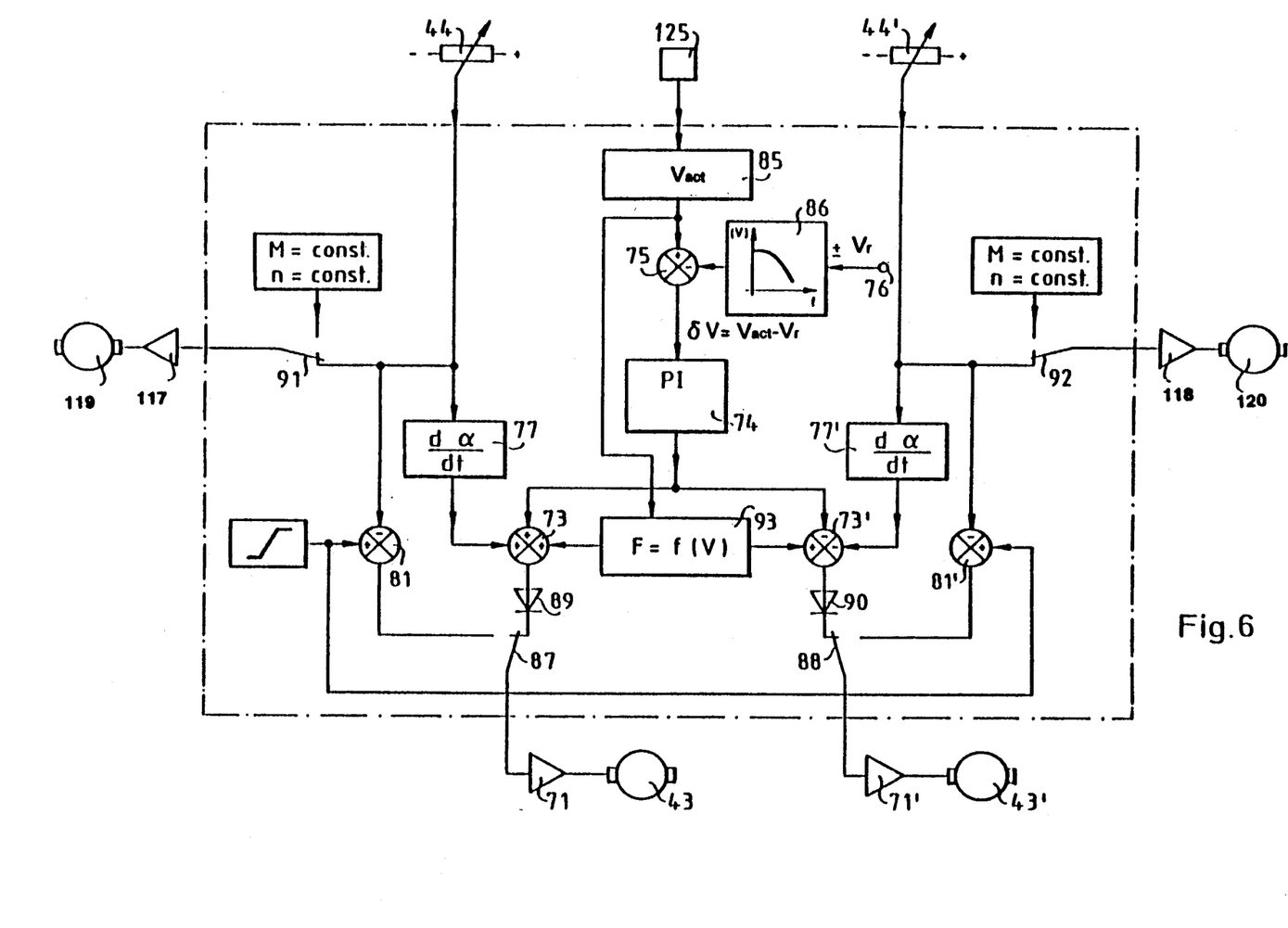
FIG. 6 is a block circuit diagram of a regulation circuit for the tape transport device of the invention.

FIG. 6 shows a circuit block diagram of a regulating circuit which makes possible both the tape tension regulation during operation and also the control of the tape tension motors for threading the tape into and out of the tape transport device. Basically, this circuit can be designed for analog or digital signals. In the use of digital signals, it is possible on one hand to provide an implementation with individual components, such as adders, filters, etc. or on the other hand, to implement the functions illustrated in the circuit block diagram of FIG. 6 by a suitably programmed microcomputer.

The pulses generated by the pulse generator 125, corresponding to the tape speed $v_{act}$ are first converted into a signal suitable for further processing in a converter circuit 85, which for example may convert them into a digital signal. The reference value $v_r$ is transmitted from the input 76 to the subtractor 75 over a circuit 86 having a low-pass characteristic. In that way, for example, when a signal is supplied to the subtractor 75 after entering into the tape transport mechanism a jump-like change of the value reference signal $v_r$, the signal supplied to the subtractor changes in a manner corresponding to a ramp. The difference signal $\delta v$ is supplied to the PI regulator 74. In contrast to the schematic representation in FIG. 4, a common regulator 74 is provided in the regulating circuit of FIG. 106 for both sides of the scanner. The output of the regulator 74 is then supplied to the adder 73 and to the subtractor 73'.

As already described in connection with FIG. 4 the adder 73 and the subtractor 73' respectively receive over differentiating circuits 77 and 77' the time derivatives of the output signals of angle transducers 44 and 44'. Furthermore, a predetermined value F for the tape tension is supplied to the adder 73 and to the subtractor 73'. According to a further development of the invention, it is provided that with increasing tape speed the tape tension is raised within the permissible region for the particular tape. For that purpose, a corresponding control magnitude F is derived from the speed v in a circuit 93. By this precaution it is prevented that at high reverse reeling speeds an air cushion should arise between the already existing winding and the new winding coming into place, which would prevent uniformly firm winding. Windings that are loose in that fashion provide disturbances, for example, when a sudden rise in the current of the winding motor takes place, the inner windings and the motor reach a high rotary speed until the windings are pulled firmly together. Because of the high rate of revolution that is reached, a very high tape tension arises for a short time in the pulling of the tape, which can lead even to a tearing of the tape.

The amplifiers 71 and 71' of the tape tension motors 43 and 43' are respectively connected to the adder 73 and to the subtractor 73' through changeover switches 87 and 88 and diodes 89 and 90. In their position shown in the drawing the changeover switches provide operation with regulated tape tension, whereas in their other position, a threading in or threading out of the magnetic tape can be performed. The diodes 89 and 90 assure that the tape tension levers are not subjected to a high torque that is directed in the sense of a tape loosening.

The angle transducers 44 and 44', the amplifiers 17 and 18 and the reel motors 19 and 20 are connected to the regulating circuit according to FIG. 6 in exactly the same way as has already been shown in FIG. 4. Ahead of the inputs of the amplifiers 17 and 18, however, there are respectively provided changeover switches 91 and 92. In the illustrated in switch positions, these changeover switches provide for the above described regulation of the reel motors, whereas in the other position of the changeover switches a constant voltage or a constant current is provided to the reel motors 119 and 120 according to the requirements in the particular case for obtaining a constant rotational speed n or a constant torque M.

Although the invention has been described with reference to particular illustrative examples, it will be understood that variations and modifications are possible within the inventive concept.

We claim:

1. A magnetic tape transport device having
two reel devices for winding up and unwinding a magnetic tape,
tape guide elements,
a scanner for scanning the tape,
a first tape tension roller mounted on a first swingable tape tension lever, said lever being mounted so as to be swingable about a first axis,
a first motor for controlling tape tension having a shaft which is affixed directly to said first lever for swinging said lever about said first axis,
a second tape tension roller mounted on a second swingable tape tension lever, said lever being mounted so as to be swingable about a second axis,
a second motor for controlling tape tension having a shaft which is affixed directly to said second lever for swinging said lever about said second axis, wherein:
said first tape tension roller, and said first motor are coupled to said first lever, being component parts of a first tape tension device, and said second tape tension roller and said second motor are coupled to said second lever, being component parts of a second tape tension device;
said first tape tension device is located for engagement of said first tape tension roller with said tape on the path of said tape between said scanner and a first one of said two reel devices operating as a supply reel and said second tape tension device is located for engagement of said second tape tension roller with said tape on the path of said tape between said scanner and a second one of said two reel devices operating as a take-up reel;
said first tape tension lever is connected with an angular position indicator for producing an electrical angular position signal;
a regulating circuit is provided for detecting deviation ($\delta v$) of the tape speed ($v_{act}$) from a value corresponding to the sum of a reference tape speed value ($v_r$) and a tape tension reference value (F) derived from said tape speed and providing, in response to said deviation ($\delta v$), a controlling direct current for said first motor for controlling tape tension;
each of said reel devices is equipped with a reel drive motor connected to a reel device regulator for controllably driving a reel of said reel device, and said output signal of said angular position indicator is a control magnitude for the corresponding reel drive regulator.

2. The device of claim 1, wherein a spring is provided for exerting a torque on said shaft of each said motor and thereby each bringing the corresponding tape tension lever into a predetermined angular position when said motor, the shaft of which is connected thereto, has no electric current supplied to it.

3. The magnetic tape transport device of claim 1, wherein said scanner comprises a tape guiding cylinder which is at least partly surrounded by a loop of said magnetic tape.

4. The magnetic tape transport device of claim 1, wherein both of said tape tension levers are connected with respective angular position indicators, each for producing an electrical angular position signal and wherein said regulating circuit provided for detecting deviation ($\delta v$) of the tape speed ($v_{act}$) from a value corresponding to the sum of said reference value ($v_r$) and said tape tension reference value (F) is connected for providing, in response to said deviation ($\delta v$), a controlling direct current for each of said motors for controlling tape tension, and said output signal of each of said angular position indicators is a control magnitude for the corresponding reel drive regulator, and said regulating circuit is capable of controlling direct current for both of said motors for controlling tape tension, whereby either of said two reel devices may operate as a supply reel and either of said tape tension rollers may operate in engagement with said tape on the path of said tape between said scanner and said reel device operating as a supply reel.

5. The magnetic tape transport device of claim 4, wherein means are provided for increasing said predetermined tape tension (F) with increasing tape speed.

6. The magnetic tape transport device of claim 4, wherein means are provided for controlling said first tape tension lever by said first motor for threading a magnetic tape from a cassette into said magnetic tape transport device and wherein means comprising a regulation loop, constituting a regulator for a threading operation, including said first motor and said indicator of angular position of said first tape tension lever, are provided for operation of said first tape tension lever in a threading mode of operation by movement of said first tape tension lever at a predetermined speed for threading in or threading out tape from and to a cassette.

7. The magnetic tape transport device of claim 1, wherein a means for obtaining a time derivative of an electrical signal is interposed between said output of said angular position indicator and said regulating circuit for detecting said deviation (δv) of tape speed, whereby said direct current for controlling said first motor from the output of said regulating circuit further includes the difference between the value of the time derivative of the electrical signal of said angular position indicator.

8. The magnetic tape transport device of claim 1, wherein means are provided for controlling said first tape tension lever by said first motor for threading a magnetic tape from a cassette into said magnetic tape transport device.

* * * * *